Patented Apr. 27, 1954

2,676,972

UNITED STATES PATENT OFFICE 2,676,972

HYDROGENATION DERIVATIVES OF DIFURFURALACETONE

Kliem Alexander and Lester E. Schniepp, Peoria, Ill., assignors to the United States of America as represented by the Secretary of Agriculture No Drawing. Original application June 22, 1951, Serial No. 233,098, now Patent No. 2,657,220, dated October 27, 1953. Divided and this application March 26, 1953, Serial No. 346,812

4 Claims. (Cl. 260—347.8)

(Granted under Title 35, U. S. Code (1952), sec. 266)

The invention herein described may be manufactured and used by or for the Government of the United States of America for governmental purposes throughout the world without the payment to us of any royalty thereon.

This application is a division of Serial No. 233,098, filed June 22, 1951, now Patent No. 2,657,220.

This invention relates to the novel chemical compounds, 2-($\beta$-furylethyl)-1,6-dioxaspiro-[4.4] nonane (I), 2-($\beta$-tetrahydrofurylethyl)-1,6-dioxaspiro-[4.4] nonane (II), 1-tetrahydrofuryl-3,6,9 nonanetriol (III) and 1,4,7,10,13-tridecanepentanol (IV). These chemicals are derived from difurfuralacetone by controlled hydrogenation.

Difurfuralacetone is one of the two simple condensation products of furfural and acetone. It may be made by mixing furfural and acetone in 2:1 molar ratio, cooling the mixture and adding sodium hydroxide. The condensation product crystallizes after standing. It has the following structural formula:

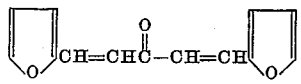

According to our invention, difurfuralacetone is subjected to catalytic hydrogenation, preferably with a copper chromite or nickel-on-kieselguhr catalyst in such a manner that the hydrogenation occurs stepwise. The desired products of each step of hydrogenation may be isolated from the reaction mixture and subsequently further hydrogenated to produce products of a greater degree of hydrogenation.

The catalytic hydrogenation of difurfuralacetone produces a mixture of (I) and 1,5-difurylpentanol-3, when a copper chromite-type catalyst is employed. Further hydrogenation of the crude hydrogenation mixture of 1,5-difurylpentanol-3 with a nickel catalyst, such as Raney nickel, results in compounds saturated in the furyl portion of the molecule. Thus, hydrogenation of (I) gives (II); 1,5-difurylpentanol-3 gives 1,5-ditetrahydrofurylpentanol-3; and the mixture from copper chromite catalyzed reduction, when further hydrogenated with a nickel catalyst, gives a mixture of (II) and 1,5-ditetrahydrofurylpentanol-3, the latter being usually the main fraction.

The foregoing stepwise hydrogenations are effected in the substantial absence of water. If water is present, however, the hydrogenation is accompanied by rupture of the oxygen-containing rings. Thus, the hydrogenation of 1,5-difurylpentanol-3 in the presence of substantial amounts of water results in (III) and (IV). The same products result from the hydrogenation of (I), or the crude reaction mixture containing 1,5-difurylpentanol-3 and (I).

This latter type of reaction may be termed a combined hydrogenation and hydrolysis, even though the actual chemical mechanisms involved have not been determined exactly.

The compounds of this invention have the following structural formulae:

(I)
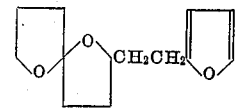

(II)
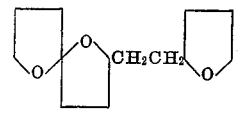

(III)
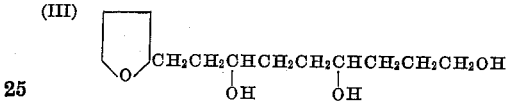

(IV)
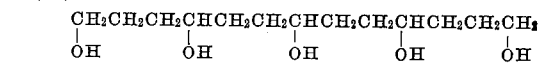

They are useful as intermediates in the chemical industry, in the field of solvents and plasticizers, hydraulic fluids, lubricant additives, humectants, and medicinals. The following specific examples illustrate the invention. The methods of preparation described in these examples are not intended to be limiting inasmuch as variation of temperatures, reaction times, catalysts, and the like will readily occur to those skilled in the art.

*Example 1*

A solution of 107 g. of difurfuralacetone in absolute alcohol, made up to a total volume of 370 ml., was hydrogenated in the presence of 4.3 g. of copper chromite catalyst. The hydrogenation temperature was 120°–136° C., maintained for 2 hrs. or until the hydrogen absorption had practically stopped. The catalyst was removed from the reaction product by filtration, and the filtrate was subjected to fractional distillation at 0.08 mm. The main fraction consisted of 1,5-difurylpentanol-3. The lowest boiling portion (20 percent) of the product was refractionated repeatedly to give a fraction (8.1 g.) boiling at 84°–85° C. This fraction consisted of (I): $n_D^{25}$ 1.4888; $d_4^{25}$ 1.087.

*Anal.*—Calc'd. for $C_{13}H_{18}O_3$: C, 70.2; H, 8.16; OH, 0.00. Found: C, 69.7; H, 8.02; OH, 0.00.

Example 2

To the filtrate obtained by removing the copper chromite catalyst from a solution, hydrogenated as in the example above, was added 7 g. of Raney nickel catalyst. The material was then reacted with hydrogen at 32°–140° C. for 2 hrs. The catalyst was removed by filtration, and fractionation of the lower boiling components gave 11.2 g. of (II), a colorless liquid, B. P. 90°–95° C. (0.09 mm.): $n_D^{25}$ 1.4720; $d_4^{25}$ 1.0403. It is a mobile liquid of mild, pleasant odor, only slightly soluble in water at room temperature.

*Anal.*—Calc'd. for $C_{13}H_{22}O_3$: C, 68.95; H, 9.80; OH, 0.0. Found: C, 68.65; H, 9.66; OH, 0.0.

The main fraction consisted of 1,5-ditetrahydrofurylpentanol-3.

Example 3

(I), prepared by the method of Example 1, (49.6 g.) was admixed with 5 g. of Raney nickel catalyst and 214 ml. of absolute ethanol. The mixture was hydrogenated at 40°–117° C. for 3½ hrs. The amount of hydrogen absorption was slightly greater than that required for saturation of two double bonds. The catalyst was removed by filtration, and the filtrate fractionated. The main fraction, 32.2 g., was a colorless liquid, B. P. 96°–101° C. (0.17 mm.). It was (II), $n_D^{25}$ 1.4720, identical with the product of Example 2.

In the following example, there is illustrated the preparation of (III) and (IV), employing 1,5-difurylpentanol-3 as the starting material. As previously noted, we may substitute instead, the crude reaction mixture such as obtained in Example 1. In this example, the presence of substantial amounts of water is necessary, together with more intense catalytic effect of the nickel-type catalysts. As illustrated, we prefer nickel-on-kieselguhr catalysts, and we prefer to carry out the reaction in an aqueous medium. It is to be understood that the isolated pentanol or the unfractionated hydrogenation mixture containing the pentanol as the main constituent, such as obtained in Example 1, may be substituted with no substantial difference in procedure. Likewise, the same results may be obtained by substituting (I).

Example 4

One hundred sixty-five grams (0.075 mole) of 1,5-difurylpentanol-3, 220 g. of water, 7.0 g. of nickel-on-kieselguhr catalyst and a trace of 90 percent formic acid (approximately 0.3 ml.) was reacted with hydrogen at 200°–210° C. for 5 hrs. or until hydrogen absorption had practically stopped. The catalyst was removed by filtration, and the reaction product was subjected to fractional distillation at 0.16 mm. The fraction boiling between 191°–200° C. amounted to 65.0 g. It was (III), B. P. 194° C., (0.15 mm.), $n_D^{23}$ 1.4913, $d_4^{25}$ 1.076.

*Anal.*—Calc'd. for: $C_{13}H_{26}O_4$: C, 63.4; H, 10.63; OH, 20.73. Found: C, 63.1; H, 10.7; OH, 20.59.

Example 5

The undistillable residue from Example 4 above amounting to 30.1 g. was washed with acetone to give a solid product which was recrystallized and identified as (IV).

*Anal.*—Calc'd. for: $C_{13}H_{28}O_5$: C, 59.1; H, 10.67; OH, 32.16. Found: C, 59.0; H, 10.3; OH, 32.8.

In place of the 1,5-difurylpentanol-3 employed in Example 4 above, we may substitute either the hydrogenation mixture produced in Example 1 or the (I) product.

The product of Example 4 is soluble in acetone and water, whereas the product of Example 5 is soluble in water, but insoluble in cold acetone.

We claim:

1.

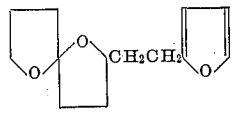

2.

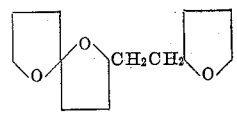

3. The method comprising subjecting difurfuralacetone in the substantial absence of water and in the presence of a copper chromite catalyst to hydrogen at an elevated temperature to produce a reaction mixture containing the product, 2-(β-furylethyl)-1,6-dioxaspiro-[4.4] nonane and recovering said product by fractionation distillation.

4. The method comprising subjecting difurfuralacetone in the substantial absence of water and in the presence of a copper chromite catalyst to hydrogen at an elevated temperature to produce a reaction mixture containing the product, 2-(β-furylethyl)-1,6-dioxaspiro-[4.4] nonane, further hydrogenating the said product in the presence of a nickel catalyst to produce a reaction mixture containing 2-(β-tetrahydrofurylethyl)-1,6-dioxaspiro-[4.4] nonane and recovering said 2-(β-tetrahydrofurylethyl)-1,6-dioxaspiro-[4.4] nonane by fractional distillation.

No references cited.